United States Patent [19]

Yasukawa

[11] Patent Number: 5,678,078
[45] Date of Patent: Oct. 14, 1997

[54] CAMERA CAPABLE OF COMMUNICATING WITH AN EXTERNAL DEVICE VIA COMMUNICATION CONTACT POINTS ARRANGED IN A CARTRIDGE COMPARTMENT

[75] Inventor: Seiichi Yasukawa, Yotsukaido, Japan

[73] Assignee: Nikon Corporation, Tokyo, Japan

[21] Appl. No.: 522,579

[22] Filed: Sep. 1, 1995

[30] Foreign Application Priority Data

Sep. 7, 1994 [JP] Japan .................. 6-2141120

[51] Int. Cl.⁶ ............................................. G03B 7/00
[52] U.S. Cl. .............................. 396/208; 396/300
[58] Field of Search ........................ 396/208, 207, 396/209, 300

[56] References Cited

U.S. PATENT DOCUMENTS

5,477,286  12/1995  Ohkawa ........................ 396/208

Primary Examiner—David M. Gray

[57] ABSTRACT

A camera capable of communicating with an external device, such as an adjustment device for performing camera testing, checking and adjustment operations. The camera includes a cartridge compartment having a wall member to accommodate a film cartridge, the wall member including a recessed portion, e.g., a hole or concavity, in the inner wall surface of the cartridge compartment to accommodate communication contact points which electrically connect the external device to the camera. A control unit which controls camera operations receives signals from the external device via the communication contact points and performs a predetermined camera operation based upon the received signals. The cartridge compartment also includes film sensitivity contact points, the film sensitivity contact points including a standard potential film sensitivity contact point which is also used to connect the adjustment device. The adjustment device can also start the power supply of the camera in accordance with electrical signals from the adjustment device which control an electrical power feed device, such that an operator does not have to operate camera mechanisms while performing testing, checking and adjustment operations.

19 Claims, 7 Drawing Sheets

CAMERA CAPABLE OF COMMUNICATING WITH AN EXTERNAL DEVICE VIA COMMUNICATION CONTACT POINTS ARRANGED IN A CARTRIDGE COMPARTMENT

BACKGROUND OF THE INVENTION

1. Field of the Invention

The present invention relates to a camera having an information input-output function to communicate with an external device and, more particularly, the present invention relates to a camera having communication contact points arranged in a film cartridge compartment for connecting the external device.

2. Description of the Related Art

Cameras have become high precision electronic instruments which require checking, testing and adjustment operations to be carried out after assembly is completed. An example of a checking and adjustment operation is the final decision of semi-permanent information written and stored in an internal memory of the camera. In performing the checking, testing and adjustment operation, a dedicated device (referred to hereinafter as an "adjustment device") is connected to a contact point of the camera, and reading/writing of the desired data is performed via the contact point. Various adjustment devices are known. For example, Japanese Laid-Open Patent Publication JP-A-1-287636 discloses an adjustment device which uses a camera film sensitivity contact point ("DX contact point"), via which a film sensitivity code pattern ("DX code pattern") is read from a film cartridge, as a contact point to connect the adjustment device.

However, problems have occurred in connection with the checking and adjustment device disclosed in JP-A-1-287636. Specifically, use of the DX contact point as a contact point to connect an adjustment device gives rise to a possibility of missing a film sensitivity readout. When loading a film cartridge into the film cartridge compartment, the DX contact points of the camera and a DX code pattern of the cartridge do not all simultaneously come into contact. Further, the DX contact points momentarily coming into contact with the DX code pattern gives rise to chattering. Because of the DX contact points either not coming into contact with the DX code pattern or momentarily coming into contact with the DX code pattern, erroneous operation of the camera occurs, and in the worst case there is a risk of rewriting the information within the camera. In particular, when the rewritten information is a camera adjustment value, there is the possibility that the camera can be put into a state in which it cannot be used. Further, the DX contact point can be used as a contact point for connection of an adjustment device only if the standard of the film cartridge corresponding to the type of film used is the same as that of the adjustment device.

Further, Japanese Laid-Open Patent Publication JP-A-59-111627 discloses a device in which contact points for connecting an adjustment device are arranged in the interior of a battery compartment of a camera. The arrangement of the contact points in the interior of the battery compartment of the camera is advantageous from the point of resistance to the environment because the contact points for connecting the adjustment device are not normally exposed to the exterior.

However, problems have also occurred in connection with the device disclosed in JP-A-59-111627. In particular, because various types of batteries are used in a camera, a problem occurs in that it is difficult to design the interior of the battery compartment for use as both a battery compartment and as a connection point for an adjustment device. To design a camera having a battery compartment suitable for joint use entails an increase in the development cost of the camera and, ultimately, an increase in the price of the camera. Furthermore, separately arranged dedicated contact points for the adjustment device result in increased cost.

SUMMARY OF THE INVENTION

It is an object to the present invention to provide a camera having an information input-output function to perform communication with an external device.

It is another object of the present invention to provide a camera which communicates with an external device via communication contact points in a film cartridge compartment.

It is another object of the present invention to provide a camera having film sensitivity contact points via which a film sensitivity code pattern is input, wherein a standard potential film sensitivity contact point is used for connection of an input-output device, such as an adjustment device.

Objects of the invention are attained in accordance with embodiments of the present invention with a camera which is capable of communicating with an external device, such as an adjustment device. The camera includes a cartridge compartment having a wall member to accommodate a film cartridge. Film sensitivity contact points, via which a film sensitivity information code on the film cartridge may be read, and communication contact points, via which an external device may be connected to communicate with the camera, are both disposed within the cartridge compartment. A control unit effects a process of setting or adjusting camera information based on the signals received from the external device via the communication contact points. The wall member of the cartridge compartment includes holes in the inner wall surface of the cartridge compartment in which the communication contact points are arranged. The communication contact points are preferably arranged recessed in the holes. Alternatively, the communication contact points may be arranged in concave portions or other types of recessed portions of the inner wall surface of the cartridge compartment.

The control unit includes an input unit which receives signals input from the external device, and an output unit to output signals to the external device. An input communication contact point is connected to the input unit of the control unit and an output communication contact point is connected to the output unit of the control unit, the input communication contact point and the output communication contact point are arranged separately.

In accordance with embodiments of the present invention, the camera includes plural film sensitivity contact points to read out a film sensitivity information code on the film cartridge, communication contact points to connect the external device, and a control unit which sets or adjusts camera information according to signals input from the communication contact points. The film sensitivity information code includes a common pattern and one (1), two (2) or more information patterns, which indicate the film sensitivity by the respective states of electrical conduction between the common pattern and the information patterns. The control unit acts as a standard potential during the input-output of signals through the communication contact points, and preferably uses as the standard potential the potential of the film sensitivity contact point corresponding to the common pattern.

In accordance with embodiments of the present invention, the control unit effects a predetermined process based on signals received from the external device via the communication contact points. An electrical feed device provides an output to the control unit. An electrical feed control unit varies the electrical feed state to the control unit by causing the electrical feed device to operate based on a signal input from the communication contact point.

In accordance with embodiments of the present invention, by arranging the communication contact points recessed in a hole, concave portion or recess in the inner wall surface of the cartridge compartment, there is no contact between the film cartridge and the communication contact points, and no erroneous operation arises. Further, if the structure of the communication contact points is made common to plural kinds of cameras, a standard device can be used for checking, adjustment, and the like.

Further, by arranging the input communication contact point separate from the output communication contact point, the resistance of the communication contact points to noise is high. Furthermore, by using the potential of the communication contact point corresponding to the common pattern as the standard potential of the signals during communication, the number of the communication contact points can be reduced. Still further, since the electrical feed control device causes a change of the electrical feed state to the control unit based on the signal input from the input communication contact point located within the cartridge compartment, when performing communication it is not necessary to perform a separate operation to start the camera (for example, operation of the power supply button).

BRIEF DESCRIPTION OF THE DRAWINGS

These and other objects and advantages of the present invention will become apparent and more readily appreciated from the following description the preferred embodiments taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
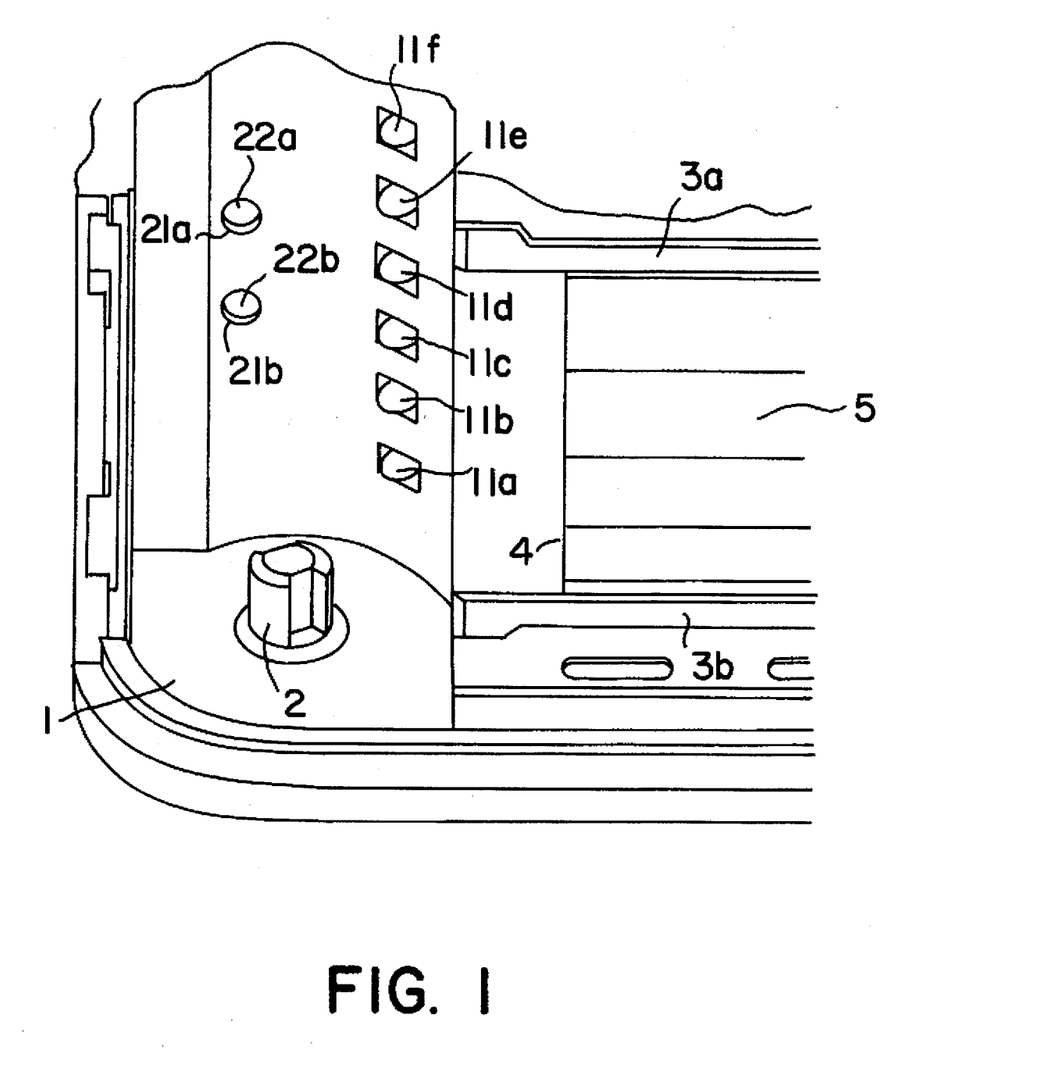
FIG. 1 is a schematic oblique view of a camera in accordance with embodiments of the present invention.

FIG. 1 is an oblique view of a camera with the back opened showing a film cartridge compartment in accordance with embodiments of the present invention. As shown in FIG. 1, an aperture 4 is arranged in a rear body structure 1 of the camera. Normally, the aperture 4 is closed by a shutter blind 5 which may be a single blind or a series of blinds. At the time of photography (exposure time), the shutter blind 5 opens, and light enters through the aperture 4 causing the film to be exposed. Internal rails 3a and 3b are arranged above and below the aperture 4 to guide the film to the aperture 4.

A film cartridge compartment is located to the left of the aperture 4. A fork 2 for winding and rewinding the film is arranged in the bottom of the film cartridge compartment. The film is loaded into the film cartridge compartment such that a film leader is pulled out facing in the right-hand direction of FIG. 1.

DX contact points 11a–11f (i.e., camera film sensitivity contact points) are arranged in an inner wall in the film cartridge compartment. The DX contact points 11a–11f are positioned to correspond to a DX code pattern (i.e., film sensitivity information code pattern) arranged on the surface of the film cartridge when the film cartridge is loaded into the film cartridge compartment. Holes 21a and 21b are arranged, separately from the DX contact points 11a–11f, in the inner wall of the film cartridge compartment. As will be described in more detail later, the film sensitivity is input to the camera control circuitry via the DX contact points 11a–11f, and by decoding the film sensitivity information code pattern on the film cartridge the film sensitivity is identified. Flat form contact points 22a and 22b are arranged over the holes 21a and 21b, respectively.

Figure 2:
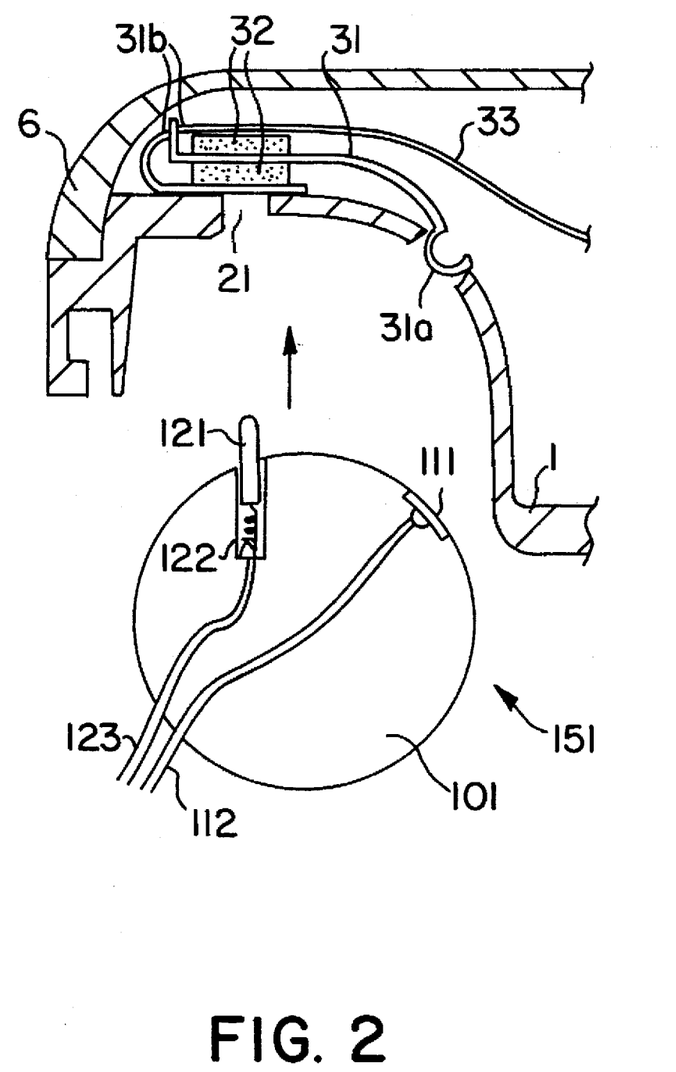
FIG. 2 is a cross section of the view shown in FIG. 1 taken at the height of the contact point 11d and the contact point 22a in accordance with embodiments of the present invention.

FIG. 2 is a cross section of the oblique view shown in FIG. 1 taken at the height of the contact point 11d and the flat form contact point 22a. As shown in FIG. 2, the DX contact points 11a–11f are comprised of leaf springs 31 located in a space lying between the rear body 1 and a front body 6 of the camera. The origin of the leaf spring 31 is fixed by fixing members 32 comprising insulating material, and an end portion 31a of the leaf spring 31 is formed into a semicircular shape and inserted into a hole 70 formed in the film cartridge compartment inner wall. With the leaf spring 31 arranged in the above-described state, the end portion 31a of the leaf spring 31 is urged toward the interior of the film cartridge compartment. The end portions 31a of the leaf springs 31 correspond to the DX contact points 11a–11f shown in FIG. 1. The leaf springs 31, which form the DX contact points 11a–11f, are soldered to a flexible printed board 33 at a root portion 31b, and are also electrically connected to the control circuit.

The structure of the flat form contact points 22a and 22b will now be described with reference to FIG. 2. The contact points 22a and 22b are preferably gold plated buttons arranged on a flexible printed board 33 located between the rear body 1 and the front body 6. The flexible printed board 33, the contact points 22a and 22b (i.e., the gold plated buttons) and the holes 21a and 21b are arranged in an overlapped state and are pressed by the fixing members 32 from the rear side of the film cartridge compartment inner wall. With the flexible printed board 33, gold plated buttons, holes 21a and 21b and fixing members 33 arranged in the above-described manner, portions of the gold plated buttons are exposed through the holes 21a and 21b and make up the contact points 22a and 22b, respectively.

According to the above-described structure, the contact points 22a and 22b are located on the side of the holes 21a and 21b formed in the inner wall of the film cartridge compartment opposite the film cartridge when the film cartridge is placed on the film cartridge compartment. Accordingly, the contact points 22a and 22b do not contact the film cartridge. Alternatively, the holes 21a and 21b located in the inner wall of the cartridge compartment may simply be recesses in the film cartridge compartment, such as concave recesses in the film cartridge compartment, having a small aperture through which the contact points 22a, 22b fit. However, in any case, it is preferable that the contact points 22a and 22b do not project in the inner wall of the film cartridge compartment further than the apertures in the recessed portions such that the contact points 22a and 22b do not contact the film cartridge.

The contact points 22a and 22b are electrically connected to a control circuit (not shown in FIG. 2). In order to form a reliable connection to the adjustment device, the size of the gold plated buttons is larger than the diameter of the holes 21a and 21b.

A brief description of an adjustment device which may be applied to a camera in accordance with embodiments of the present invention will now be provided below with reference to FIG. 2. The adjustment device performs operations such as the setting, checking and adjustment of camera information in memory; testing operations, such as the execution of subroutines and mechanical sequences, etc. The adjustment device comprises a probe unit 151 to connect to the contact points 22a and 22b, and an adjustment device body having a control unit (not shown) to perform transfer of information to and from the camera through the probe unit 151. An outline of the probe unit 151 is shown in FIG. 2.

As shown in FIG. 2, the probe unit 151 has a cylindrical support body 101 of approximately the same size as a film cartridge. A flush contact point 111 is arranged at a position on the support body 101 facing the DX contact point 11a when the support body 101 is received in the film cartridge compartment. The flush contact point 111 is for ground ("GND") connection use. A contact point pin 121 via which information is input to the camera and output from the camera is arranged at a position of the support body 101 facing the contact points 22a and 22b when the support body 101 is received in the film cartridge compartment. The contact point pin 121 is urged forward in the camera optical axis direction by a coil spring 122 when the probe unit 151 is loaded into the film cartridge compartment, such that the end of the contact point pin 121 projects outside the circumference of the surface of the cylindrical support body 101. The contact point pin 121 is connected through a lead wire 123 to the control unit in the adjustment device body. The flush contact point 111 for GND connection use is also similarly connected through a lead wire 112 to the control unit in the adjustment device body. A description of the control unit of the adjustment device body will not be provided.

Figure 3:
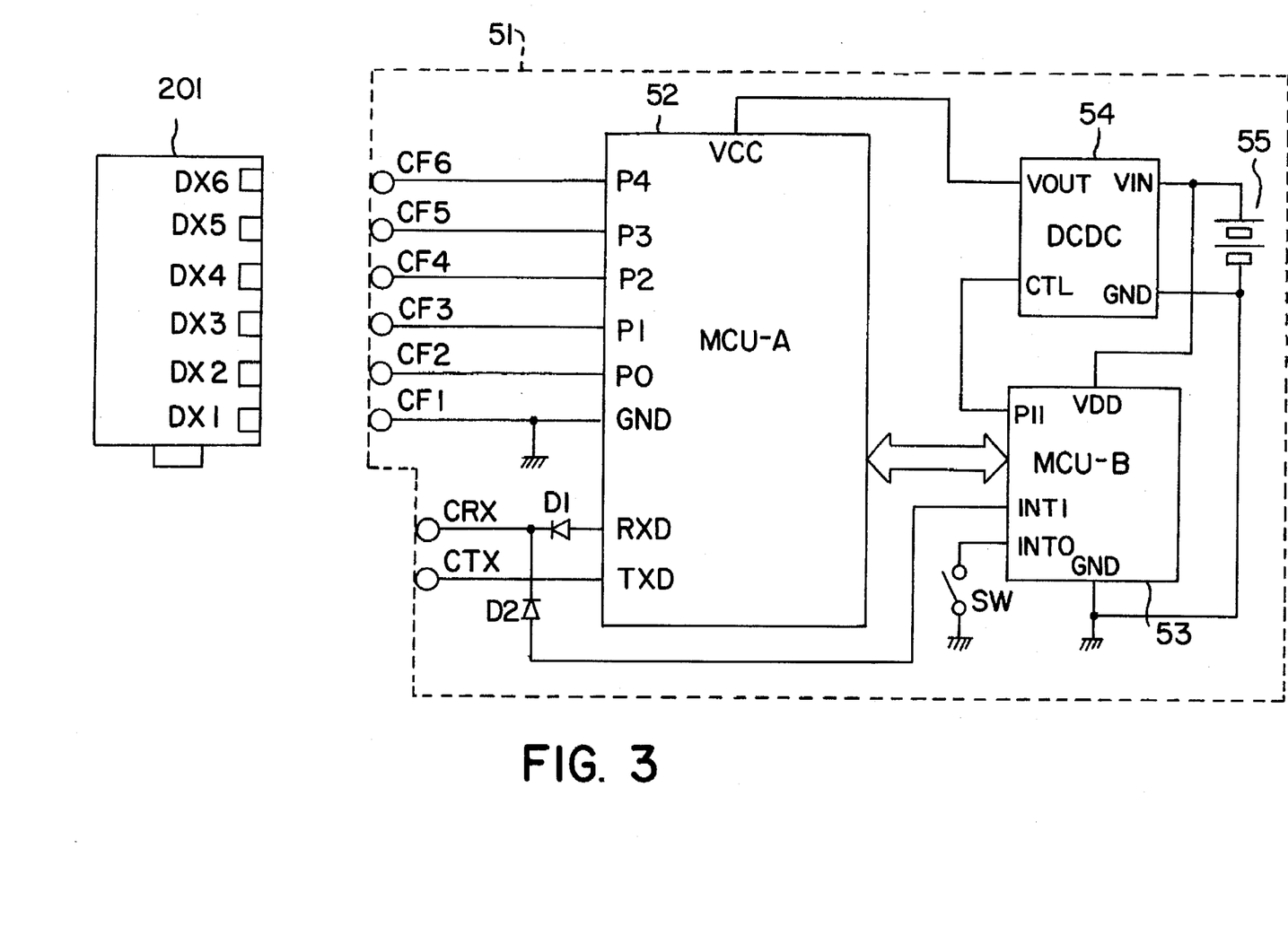
FIG. 3 is a block diagram of a camera control circuit and a film cartridge having a film sensitivity information pattern showing the relationship between the film sensitivity information pattern of the film cartridge and the camera control circuit in accordance with embodiments of the present invention.

FIG. 3 shows a camera control circuit 51 and a film cartridge 201 having a film sensitivity information pattern (DX code pattern) in accordance with embodiments of the present invention. The camera control circuit 51 in accordance with embodiments of the present invention comprises a microcomputer unit (MCU-A) 52, a microcomputer unit (MCU-B) 53, and a DC-DC converter 54. The components of the control circuit 51 are supplied power from a power supply 55 which is the battery of the camera.

The microcomputer unit 52 comprises a CPU, a memory, and software stored in the memory and executed by the CPU. The microcomputer unit 52 controls the various photographic operations of the camera in accordance with embodiments of the present invention by executing the various software stored in the memory.

The camera control circuit 51 includes a total of eight (8) contact points (CF1–CF6, CRX, CTX) for input and output of information. Contact points CF1–CF6 correspond to the DX contact points 11a–11f, respectively, shown in FIG. 1, and are used to read out the DX code pattern from the film cartridge compartment. The contact points CF1–CF6 are connected to the input ports GND and P0–P4, respectively, of the microcomputer unit 52. The DX code pattern is read from the film cartridge 201 via the DX contact points 11a–11f (FIG. 1) and is input to the input ports P0–P4 and GND of the microcomputer 52.

The film sensitivity is stored in a DX code pattern in the film cartridge 201 as five (5) bits of information. The state of each bit of the DX code pattern is determined by the conduction state (ON/OFF) between a common pattern and the particular DX code pattern. In accordance with embodiments of the present invention, the DX code pattern 1 (DX1) is the common pattern, and its surface always exposes a conductor. The surfaces of the DX code patterns 2–6 (DX2–DX6) expose either a conductor or an insulator according to the film sensitivity. The camera can read out the film sensitivity by identifying the respective state of conduction (ON/OFF) between the ground contact point CF1 and the contact points CF1–CF6.

The adjustment device connects to the contact points CRX and CTX. The contact points CRX and CTX in FIG. 3 correspond to the contact points 21a and 21b, respectively, shown in FIG. 1. The contact point CRX is connected through a diode D1 to a receiving port RXD of the microcomputer unit 52. Further, the contact point CRX is connected through a diode D2 to an input port INT1 of the microcomputer unit 53. The contact point CTX is connected to a transmitting terminal TXD of the microcomputer 52.

The receiving port RXD and the transmitting port TXD perform input and output of information, respectively, with the adjustment device. As described above, the transmitting port TXD is connected to the contact point CTX, and the receiving port RXD is connected, via diode D1, to the contact point CRX. The microcomputer unit 52 can write/read the contents of internally or externally existing memory based on signals input through the receiving port RXD or output through the transmitting port TXD.

The microcomputer unit 53 includes a CPU, memory, and software, etc., which is stored in the memory and is executed by the CPU. The microcomputer unit 53 operates with electric power provided from the battery 55 through a feed terminal VDD and a ground terminal GND. The microcomputer unit 53 includes input ports INT0 and INT1, and an output port P11. The microcomputer unit 53 sets the feed state of the supply of electric power to the microcomputer unit 52 based on signals which are input at the input ports INT0 and INT1.

The microcomputer unit 52 receives a supply of electric power from the DC-DC converter 54 through a feed terminal $V_{cc}$. The DC-DC converter 54 converts electric power provided by the camera battery 55 to a predetermined voltage, and provides electric power to the microcomputer unit 52 from a secondary power supply output contact point VOUT. The feed of the microcomputer unit 52 by the DC-DC converter 54 is controlled by signals input from the microcomputer 53 to a control signal input terminal CTL. Specifically, the state of feed to the microcomputer unit 52 is changed according to instructions from the microcomputer unit 53 output from the output port P11 to the control signal input port CTL of DC-DC converter 54.

A switch SW is connected to an interrupt input port INT0 of the microcomputer unit 53 and is set ON/OFF according to a half depression of a camera release button (not shown). Specifically, when the release button is half depressed, the switch SW outputs a low (L) level signal to the microcomputer 53, and when the release button is not half depressed a high (H) level signal is input to the microcomputer unit 53.

The microcomputer unit 53 is internally equipped with state flags which indicate a power supply standby state and a power supply maintenance state. The power supply standby state is a state in which no electric power is being provided to the microcomputer unit 52, and the power supply maintenance state is a state in which electric power is being provided to the microcomputer unit 52.

The microcomputer unit 53 can operate in a RUN mode and a SLEEP mode. In the SLEEP mode, the microcomputer unit 53 stops many functions to conserve electric power. However, even when the microcomputer unit 53 is in the SLEEP mode, it is able to determine the setting of the state flags. In the RUN mode, the microcomputer 53 can execute various programs, for example, to rewrite the state flags or to change the output signals from the output port P11.

The microcomputer unit 53 also includes an internal timer TMR which performs countdowns. The timer TMR is used to set the timing of a transition from the RUN mode to the SLEEP mode.

In FIG. 3, a relationship between the DX codes DX1-DX6 and the contact points CF1-CF6 is shown. The contact point CF1 contacts the DX code pattern 1 (DX1), and reads out the DX code pattern 1. Similarly, the contact point CF2 reads out the DX code pattern 2 (DX2), and the contact points CF3-CF6 read out the DX code patterns 3-6 (DX3-DX6), respectively.

Figure 4:
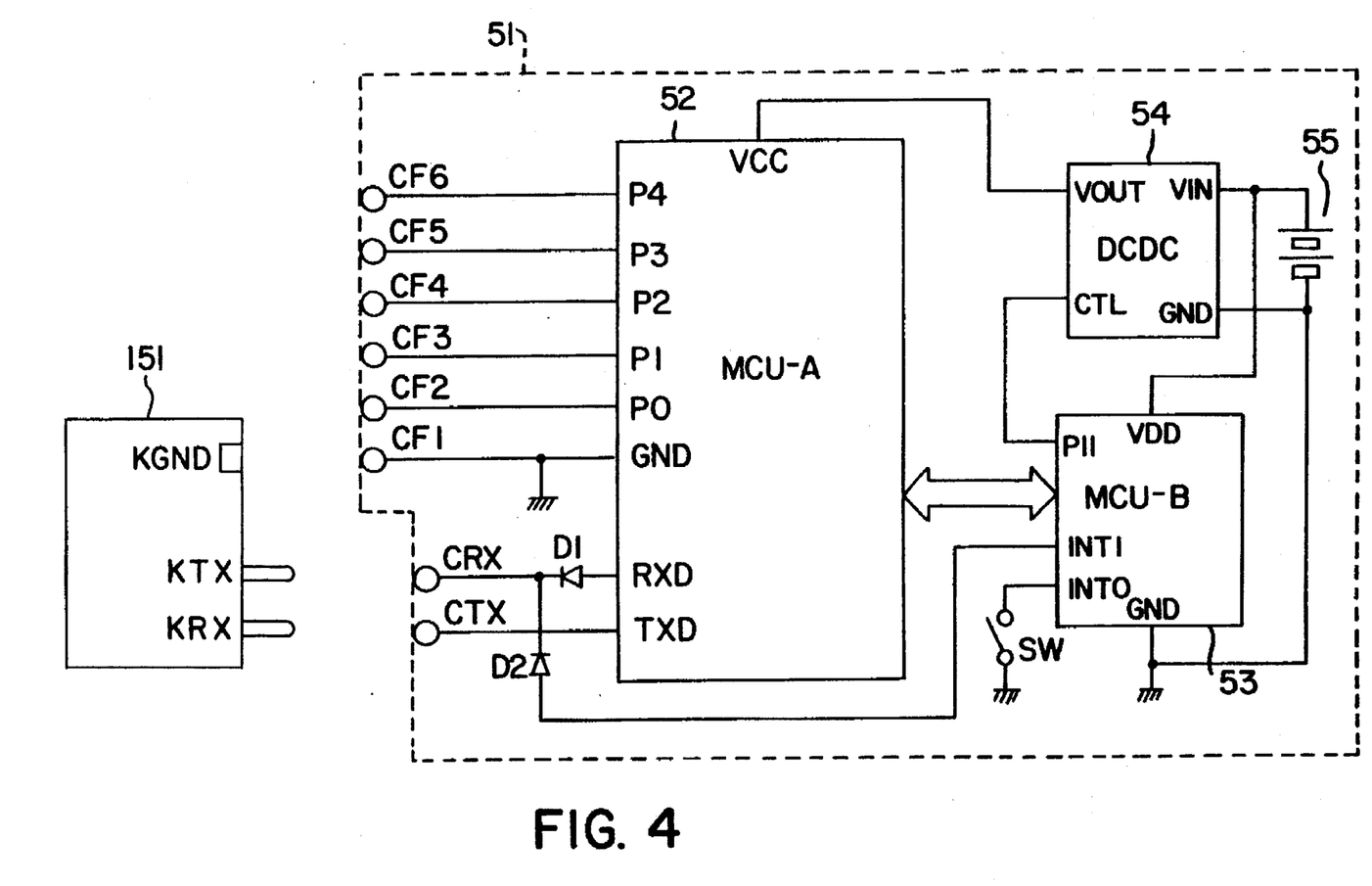
FIG. 4 is a block diagram of the camera control circuit and an adjustment device showing the relationship between the adjustment terminals of an adjustment device and the camera control circuit in accordance with embodiments of the present invention.

FIG. 4 is a block diagram showing the relationship between the contact points of the camera control circuit 51 and the contact points of the probe unit 151 of the adjustment device. A ground contact point KGND of the probe unit 151 is connected to the contact point CF1 of the control circuit 51. A contact point KTX of the probe unit 151 is connected to the contact point CRX, and a contact point KRX of the probe unit 151 is connected to the contact point CTX.

Figure 5:
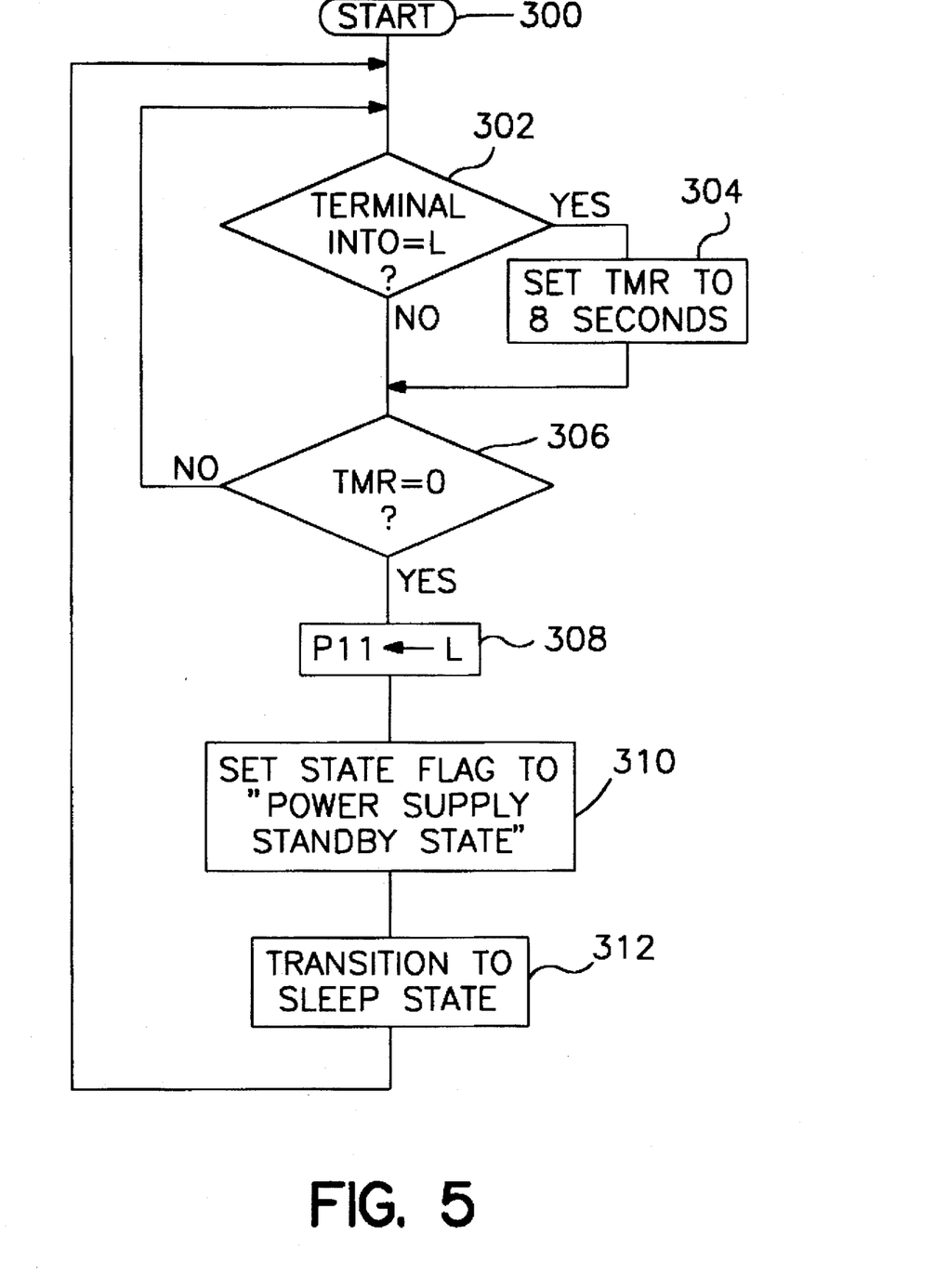
FIG. 5 is a flow chart showing a main operational process executed by the microcomputer unit 52 in accordance with embodiments of the present invention.

The operation of the camera in communicating with an external device, particularly an adjustment device, in accordance with embodiments of the present invention will now be described with reference to FIGS. 5-8. FIG. 5 is a flow chart of an operational process which is performed by the microcomputer unit 53. In FIG. 5, the operational process begins when the battery 55 is charged and the microcomputer unit 53 begins execution of a control process (step 300). The microcomputer unit 53 then checks the level of a signal input to the input port INT0 (step 302). When the level of the signal input to input port INT0 is L, specifically, when the release button is half depressed, the microcomputer unit 53 sets the timer TMR to eight (8) seconds (step 304), and the operational process proceeds to step 306. When the level of the signal input to input port INT0 is H in step 302, specifically, when the release button is not half depressed, the operational process proceeds directly to step 306.

In step 306, the microcomputer unit 53 determines whether or not the timer TMR has become zero (0). When it is determined that the timer TMR has become zero (0), this indicates that eight (8) seconds have elapsed while the release button was not operated. If eight (8) seconds have not elapsed, the operational process returns to step 302, and steps 302-306 are reiterated until eight (8) seconds has elapsed. When it is determined that the timer TMR has become zero (0), the microcomputer unit 53 outputs an L level signal at the output port P11 (step 308), causing the DC-DC converter 54 to stop the provision of electric power to the microcomputer unit 52. Next, the microcomputer unit 53 rewrites the state flag to the "power supply standby state" (step 310) indicating that no electric power is being provided to the microcomputer unit 52. Then, the microcomputer unit 53 makes a transition to the SLEEP mode (step 312). The microcomputer unit 53, upon entering the SLEEP mode, stops the execution of the operational process of FIG. 5 until an interrupt process is started.

Figure 6:
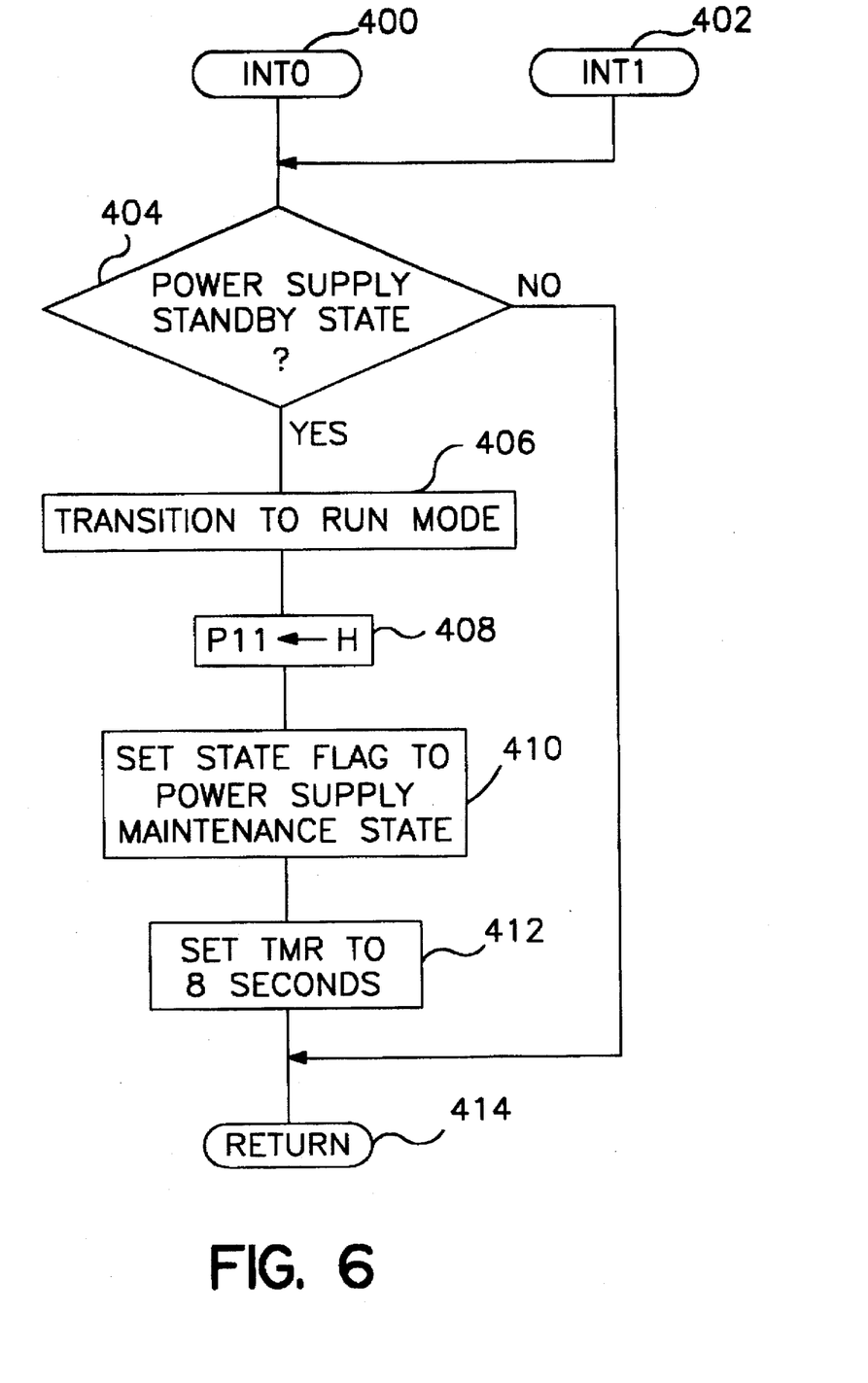
FIG. 6 is a flow chart showing a main operational process executed by the microcomputer unit 53 in accordance with embodiments of the present invention.

The interrupt process will be described below with reference to FIG. 6. The interrupt process begins when a negative edge (falling edge) signal is input to either the port INT0 (step 400) or the port INT1 (step 402). A negative edge signal is input to the port INT0 when the release button has been half depressed; a negative edge signal is input to the port INT1 when the voltage of the contact point CRX has fallen from the H level to the L level, which occurs as a result of a signal transmitted from the adjustment device.

After the interrupt process begins, the microcomputer unit 53 determines whether the state flag indicates a "power supply standby state" (step 404). When the state flag is in the "power supply standby state", a transition is made from the SLEEP mode to the RUN mode (step 406). By making the transition to the RUN mode at this time the interrupt process ends, and, after returning to the main operational process (FIG. 5), the microcomputer unit 53 resumes operation. However, when the state flag is not set to the "power supply standby state", the interrupt process ends and the operational process returns to step 312 of FIG. 5 with the state flag unchanged (step 414). Continuing, the microcomputer unit 53 outputs an H level signal from the output port P11 (step 408), and the provision of electric power to the microcomputer unit 52 by the DC-DC converter 54 is resumed. The state flag is then rewritten from "power supply standby state" to "power supply maintenance state" (step 410). Finally, the timer TMR is set to eight (8) seconds (step 412), the interrupt process ends, and the operational process returns (step 414) to step 312 of FIG. 5.

When the microcomputer unit 53 is in a SLEEP mode before the interrupt process is started, with no provision of electric power to the microcomputer unit 52, the main operational process resumes from step 302 of FIG. 5, after being stopped after execution of step 312.

The operation of the microcomputer unit 52 in performing communication with an external device, such as an adjustment device, will now be described. While electric power is being provided to the microcomputer unit 52, the microcomputer unit 52 controls normal photographic operations for a camera, such as focus detection, photometry, and display which are repeatedly performed. Further, the level of the input ports P0-P4 connected to the contact points CF2–CF6, respectively, are periodically input to the microcomputer unit 52, and by decoding the five (5) bits of information input at contact points CF2–CF6 according to predetermined rules, the film sensitivity is identified or it may be identified that a DX film is not loaded into the camera. Furthermore, the microcomputer unit 52 performs a process of monitoring whether or not serial data is input through contact point CRX to input port RXD completely independently of the above-described processes. When it is confirmed that serial data has been input to input port RXD, the microcomputer unit 52 starts a serial reception interrupt process, described below, and performs input-output of information with an adjustment device connected to the control circuit 51.

An example of communication between the camera and the adjustment device, realized by the serial reception interrupt process, will now be described with reference to FIG. 7.

It is noted that communication is performed between the adjustment device and the camera according to certain prerequisites. Firstly, the meaning of the data transmitted/ received between the camera and the adjustment device, the data length, etc. are previously defined according to the types of operations to be performed by the adjustment device. Secondly, a recognition code is defined, which is preferably one (1) byte of data, according to the type of operation the adjustment device performs. Communication between the camera and the adjustment device is commenced by first sending a signal from the adjustment device to the camera, where the first byte of transmitted data is the recognition code. The relationship between the recognition code and the operation the adjustment device performs is known to the adjustment device and to the camera. The camera includes data defining the predetermined relationship between the recognition code and the operation the adjustment device performs already stored in the memory of the microcomputer unit 52.

The serial reception interruption process is, of course, performed with the camera and the adjustment device in the connected state. With the probe unit 151 loaded into the cartridge compartment, the contact points 22a and 22b (contact points CRX, CTX) and the information input-output contact points 121 (contact points KTX, KRX) are connected. Further, the contact point 111 (contact point KGND) is connected to the contact point 11a (contact point CF1).

The adjustment device initially has to be informed of the kind of camera to which it is connected. As shown in FIG. 7, at point a of the timing diagram, electrical power is provided to the microcomputer unit 52 and one (1) byte of serial data dr1 is sent from the adjustment device via the contact point KTX and contact point CRX to the input RXD of the camera microcomputer unit 52. The serial data dr1 contains a recognition code which the microcomputer unit 52 deciphers to recognize the type of operation required by the adjustment device.

The adjustment device, then continuously sends serial data dr2–drn to the microcomputer unit 52. The serial data dr2–drn contains information which is necessary for the microcomputer unit 52 during the execution of the operations required by the adjustment device. The microcomputer unit 52 performs acquisition and storage of the serial data dr2–drn during an interrupt process. The interrupt process is carried out repetitively to receive each byte of data. The microcomputer unit 52, while receiving data, counts the number of bytes of data received. At the point in time when a predetermined number of bytes (predetermined according to the kind of operation required by the adjustment device) has been received (point b in FIG. 7), the microcomputer 52 ends the reception process.

Next, the microcomputer unit 52 deciphers the received data, and carries out the operations required by the adjustment device. The types of operations required by the adjustment device are multifarious, but in the adjustment, testing and inspection of the camera, the reading and writing of memory, the execution of subroutines, the execution of mechanical sequences, and the like are types of operations which may be required.

When the execution of the required operation ends, the microcomputer unit 52 begins (point c in FIG. 7) sending serial reply data dt1–dtm to the adjustment device 151 from the output port TXD through contact point CTX and contact point KRX of the adjustment device 151. The serial reply data transmission is a series of a predetermined number of bytes. When the transmission of serial reply data is completed (point d in FIG. 7), one (1) unit of communication between the adjustment device and the camera is completed.

Figure 7:
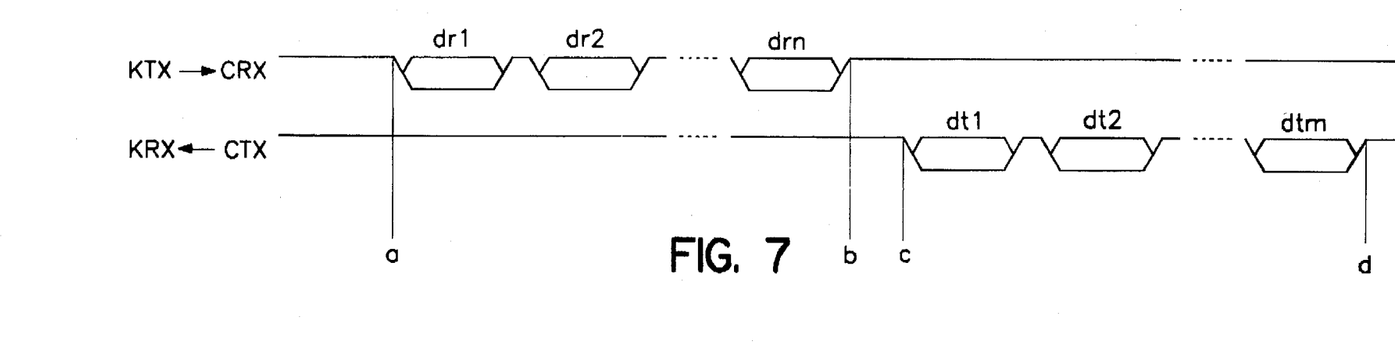
FIG. 7 is a timing diagram showing the input and output of information performed between the camera and the adjustment device in accordance with embodiments of the present invention.

In accordance with the embodiments of the present invention, as shown in FIG. 7, the provision of electric power to the microcomputer unit 52 is a prerequisite to communication commencing. Accordingly, before commencing communication, it is necessary for the operator to operate the release button, starting the microcomputer unit 52. However, operating the release button to perform inspection, testing and adjustment of the camera takes much time. To eliminate the disadvantage of having to operate the release button to perform checking and adjustment, it is possible to commence the supply of electric power to the microcomputer unit 52, while not operating the release button, in accordance with signals transmitted from the adjustment device.

An embodiment of the invention where supply of electric power is commenced without operating the release button will now be described with reference to FIG. 8.

To commence the provision of electric power to the microcomputer unit 52, firstly, it is necessary to start the microcomputer unit 53. To start the microcomputer unit 53, the adjustment device initially outputs a falling pulse signal (negative edge signal) from the contact point KTX (point e in FIG. 8). The microcomputer unit 53 commences provision of electric power to the microcomputer unit 52 in response to the falling pulse.

Figure 8:
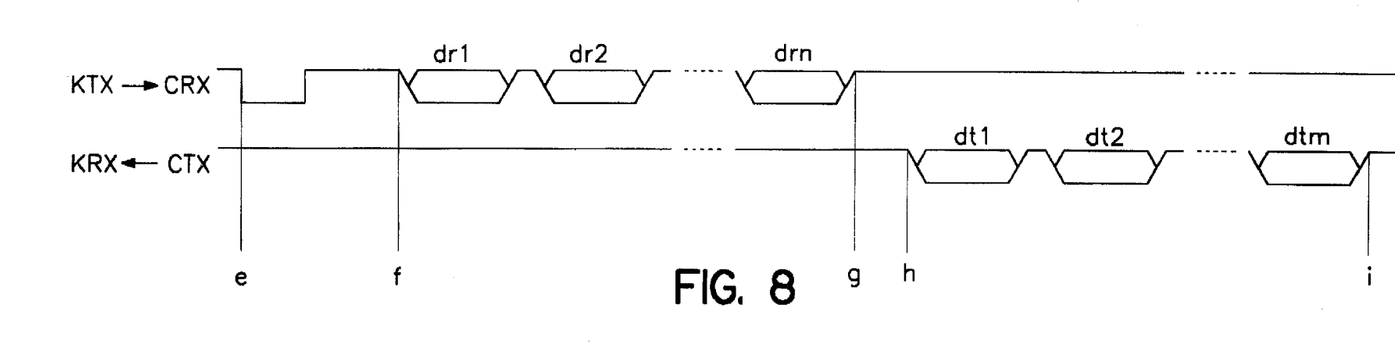
FIG. 8 is a timing diagram showing the input and output of information performed between the camera and the adjustment device in accordance with embodiments of the present invention.

Next, after a predetermined time lapse, communication between the adjustment device and the camera commences from the point f in FIG. 8, in a manner similar to that shown in FIG. 7. During the time from point e to point f, the feed of electrical power to the microcomputer unit 52 is commenced. Furthermore, at least the initialization time is necessary until the interruption of serial transmission becomes possible.

Therefore, when the adjustment device has output a falling pulse at point e electric power is provided to the microcomputer unit 52, and the reception of and interpretation of serial data dr1–drn results after a predetermined time at point f.

The microcomputer sends serial reply data dt1–dtm at point h through point i in FIG. 8, in a manner similar to that described above. In a situation that the data received by the camera consists of an undefined requirement code, opportunity for the microcomputer 52 to receive data during one (1) unit of communication process is discontinued, and the microcomputer 52 is set such that a waiting state again ensues.

In accordance with embodiments of the present invention, separate contact points are provided for the transmission and reception of data between the adjustment device and the camera. Accordingly, overlap of reception and transmission data is avoided. Thus, even under circumstances of great noise, communication with high reliability can be performed.

However, embodiments of the present invention are not limited to separate contact points for the transmission and reception of data. For example, a half duplex communication sequence may be used where transmission/reception are multiplexed such that one (1) combined use contact point is utilized. If one contact point is utilized for transmission and reception, the space in which the contact point is arranged can be small. For convenience of design, one (1) contact point may be adopted when it is desired that space saving take priority.

In accordance with embodiments of the present invention, DX contact points are standard equipment in cameras, and a standard potential is taken from a common terminal (contact point CF1) of the DX contact points during the input and output of information with an adjustment device. Accordingly, the number of contact points which must be added to the camera to connect the adjustment device can be reduced by one (1), resulting in advantages in both space and cost savings.

Further, since the contact point CRX is located within a hole or recess (e.g., a concavity) arranged in the inner wall surface of the cartridge compartment, there is no contact between the contact point CRX and the film cartridge accompanying the operations of film loading and the like. Accordingly, there is absolutely no possibility of shorting and erroneous camera operations, such as erroneous starting of the camera, do not occur.

In accordance with embodiments of the present invention, the contact points CRX and CTX are located in the film cartridge compartment. However, the contact points CRX and CTX may be located in other locations, and if the location of the contact points CRX and CTX is made common with respect to cameras of different kinds, it is possible for the adjustment device to be made common to the different types of cameras.

Furthermore, the processes of decoding the DX code and performing communication with the adjustment device are mutually independent. Since the processes of decoding the DX code and communicating with the adjustment device are mutually independent, no erroneous operation occurs during the loading of the film and the like.

Still further, in accordance with embodiments of the present invention, during the input and output of information between the adjustment device and the camera, it is not necessary to operate the release and the like operating members of the camera. Accordingly, the operation of adjustment and inspection in the manufacturing process or in the repair department can be performed with good efficiency.

Moreover, since the contact points for use with the adjustment device are located in the inner wall of the cartridge compartment, if the structure of the terminal portions used for the adjustment device are made the same for plural kinds of cameras using film of the same standard, a common type of adjustment device can be used.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A camera capable of communicating with an external device, comprising:
   a cartridge compartment including a recessed portion in an inner wall surface of the cartridge compartment;
   a communication contact point to electrically connect the external device to the camera, the communication contact point being arranged in the recessed portion of the cartridge compartment; and
   a control unit electrically connected to the communication contact point to receive signals from the external device and to transmit signals to the external device via the communication contact point and to perform a camera operation based on the received signals.

2. A camera as recited in claim 1, wherein the recessed portion in the inner wall surface of the cartridge compartment is a concave portion.

3. A camera as recited in claim 1, wherein the recessed portion in the inner wall surface of the cartridge compartment is a hole.

4. A camera as recited in claim 1, further comprising a film sensitivity contact point located in the cartridge compartment, wherein the film sensitivity contact point is a standard potential contact point, and the external device is connected to the control unit via the standard potential contact point.

5. A camera as recited in claim 1, further comprising:
   an electrical feed device to provide electrical power to the control unit, the electrical feed device having a variable feed state; and
   an electrical feed control device to cause the electrical feed device to supply power to the control unit according to a signal input from the external device.

6. A camera as recited in claim 1, wherein the control unit performs a predetermined camera operation corresponding to the respective signals received from the external device.

7. A camera as recited in claim 1, wherein the cartridge compartment is a film cartridge compartment and the communication contact point is positioned in the recessed portion such that a film cartridge does not contact the communication contact point when inserted in the film cartridge compartment.

8. A camera as recited in claim 1, wherein the control unit includes an input unit to receive signals input from the external device, and an output unit to output signals to the external device, and the communication contact point includes an input communication contact point connected to the input unit of the control unit via which signals are received from the external device, and an output communication contact point connected to the output unit of the control unit via which signals are transmitted to the external device.

9. A camera as recited in claim 1, wherein the communication contact point is a single contact point through which signals are both transmitted and received.

10. A camera capable of communicating with an external device, comprising:
    a cartridge compartment to accommodate a film cartridge having a film sensitivity information code pattern;
    a plurality of film sensitivity contact points via which the film sensitivity information code pattern of the film cartridge is read, the film sensitivity contact points including a standard potential contact point;
    a communication contact point to electrically connect the external device to the camera; and
    a control unit to receive signals from the communication contact point and to perform a camera operation based on the received signals, wherein the external device is connected to the control unit via the standard potential contact point.

11. A camera as recited in claim 10, wherein the control unit includes an input unit to receive signals input from the external device, and an output unit to output signals to the external device, and the communication contact point includes an input communication contact point connected to the input unit of the control unit via which signals are received from the external device, and an output communication contact point connected to the output unit of the control unit via which signals are transmitted to the external device.

12. A camera as recited in claim 10, wherein the communication contact point is positioned in a recessed portion of the cartridge compartment such that the film sensitivity information code pattern does not contact the communication contact point when the film cartridge is loaded in the camera.

13. A camera as recited in claim 10, further comprising:
    an electrical feed device to provide electrical power to the control unit, the electrical feed device having a variable feed state; and
    an electrical feed control device to cause the electrical feed device to supply power to the control unit according to a signal input from the external device.

14. A camera capable of communicating with an external device, comprising:
    a cartridge compartment to receive a film cartridge;
    a communication contact point to connect the external device to the camera to facilitate communication between the external device and the camera;
    a control unit to receive a signal from the communication contact point, and to control a predetermined camera operation based on the received signal;
    an electrical feed device to supply electrical power to the control unit, the electrical feed device having a variable feed state; and
    an electrical feed control device to vary the electrical feed state to the control unit, causing the electrical feed device to operate when a predetermined signal is input via the communication contact point.

15. A camera as recited in claim 14, wherein the communication contact point is located within a recessed portion of the cartridge compartment.

16. A camera as recited in claim 14, wherein the external device is an adjustment device and the adjustment device causes electrical power to be supplied to the control unit by inputting a falling edge pulse signal to the control unit.

17. A camera as recited in claim 14, wherein the control unit includes an input unit to receive signals input from the external device, and an output unit to output signals to the external device, and the communication contact point includes an input communication contact point connected to the input unit of the control unit via which signals are received from the external device, and an output communication contact point connected to the output unit of the control unit via which signals are transmitted to the external device.

18. A camera capable of communicating with an external device, comprising:
    a cartridge compartment including a recessed portion in an inner wall surface of the cartridge compartment;
    a communication contact point to electrically connect the external device to the camera, the communication contact point being arranged in the recessed portion of the cartridge compartment;
    a control unit electrically connected to the communication contact point to receive signals from the external device via the communication contact point and to perform a camera operation based on the received signals;
    an electrical feed device to provide electrical power to the control unit, the electrical feed device having a variable feed state; and
    an electrical feed control device to cause the electrical feed device to supply power to the control unit according to a signal input from the external device.

19. A camera capable of communicating with an external device, comprising:
    a cartridge compartment to accommodate a film cartridge having a film sensitivity information code pattern;
    a plurality of film sensitivity contact points via which the film sensitivity information code pattern of the film cartridge is read, the film sensitivity contact points including a standard potential contact point;
    a communication contact point to electrically connect the external device to the camera;
    a control unit to receive signals from the communication contact point and to perform a camera operation based on the received signals, wherein the external device is connected to the control unit via the standard potential contact point;
    an electrical feed device to provide electrical power to the control unit, the electrical feed device having a variable feed state; and
    an electrical feed control device to cause the electrical feed device to supply power to the control unit according to a signal input from the external device.

* * * * *

UNITED STATES PATENT AND TRADEMARK OFFICE
CERTIFICATE OF CORRECTION

PATENT NO. : 5,678,078
DATED : October 14, 1997
INVENTOR(S) : Seiichi YASUKAWA

It is certified that error appears in the above-identified patent and that said Letters Patent is hereby corrected as shown below:

Title page, Item 30, change "6-2141120" to --6-214112--.

Signed and Sealed this

Tenth Day of March, 1998

Attest:

BRUCE LEHMAN

*Attesting Officer*    Commissioner of Patents and Trademarks